Dec. 4, 1962

R. MARKS ETAL 3,066,353

APPARATUS FOR MAKING PLASTIC ARTICLES

Filed Oct. 7, 1959

INVENTORS
Raymond Marks
BY Edward Chasse

Edwin Leinohn

ATTORNEY

Dec. 4, 1962 R. MARKS ETAL 3,066,353
APPARATUS FOR MAKING PLASTIC ARTICLES
Filed Oct. 7, 1959 10 Sheets-Sheet 2

INVENTORS
Raymond Marks
Edward Chasse
BY
ATTORNEY

Dec. 4, 1962    R. MARKS ETAL    3,066,353
APPARATUS FOR MAKING PLASTIC ARTICLES
Filed Oct. 7, 1959    10 Sheets-Sheet 3

INVENTORS
Raymond Marks
BY Edward Chasse

ATTORNEY

FIG. 8

INVENTORS
Raymond Marks
Edward Chasse
BY Edwin Levisohn
ATTORNEY

Dec. 4, 1962  R. MARKS ETAL  3,066,353
APPARATUS FOR MAKING PLASTIC ARTICLES
Filed Oct. 7, 1959
10 Sheets-Sheet 6

INVENTORS
Raymond Marks
Edward Chasse
BY
Erwin Leuroher
ATTORNEY

Dec. 4, 1962

R. MARKS ETAL

3,066,353

APPARATUS FOR MAKING PLASTIC ARTICLES

Filed Oct. 7, 1959

INVENTORS
Raymond Marks
BY Edward Chasse

Edwin Leiisohn

ATTORNEY

FIG. 22

Dec. 4, 1962  R. MARKS ETAL  3,066,353
APPARATUS FOR MAKING PLASTIC ARTICLES
Filed Oct. 7, 1959  10 Sheets-Sheet 10

INVENTORS
Raymond Marks
BY Edward Chasse

ATTORNEY

United States Patent Office 3,066,353
Patented Dec. 4, 1962

3,066,353
APPARATUS FOR MAKING PLASTIC ARTICLES
Raymond Marks, New York, and Edward Chasse, Seaford, N.Y.; said Chasse assignor to said Marks
Filed Oct. 7, 1959, Ser. No. 844,948
3 Claims. (Cl. 18—20)

This invention relates to apparatus for molding articles and, more particularly, hollow thin walled articles having portions which are thicker than other portions.

In the molding of thin walled tubes made of plastic material, such as may be used for dispensing toothpaste or other semi-solid materials, the tubes are provided with a thickened shoulder part at one end thereof and a threaded part to receive a cap. Because of the difference in thickness between the wall portions of the tubes and the shoulder and cap portions, it has been found impractical to mold the tubes in one piece. This is believed due to the quick solidifying of the thin walled portions of the tube prior to the solidification of the thicker shoulder and cap portions, resulting in an inability of the plastic material, which the tube is composed of, to completely fill the mold cavities and thereby provide a continuous and homogeneous structure. Tubes of this type are produced by molding the thin walled body portion of the tube separately from the thicker shoulder and cap portions and then subsequently assembling or fusing the thicker shoulder and cap portions to the thin walled body portion of the tube.

Pursuant to the invention, means are provided permitting the molding of a hollow thin walled plastic tube which is provided with thickened shoulder and cap portions. This is accomplished by providing an apparatus which employs means for building up high pressures in the plastic molding material and subsequently permitting rapid reductions in pressure of the molding material as it flows into a mold cavity resulting in high velocity filling of the mold cavity due to the sudden release of pressure. In addition to the rapid building up and release of pressures resulting in the rapid flow of molding material, means are provided for alternately heating and cooling the mold cavities to permit the plastic molding material to remain in a softened or semi-liquid state during the mold filling operation permitting the free flow of the molding material to all parts of the mold cavities. The alternate cooling of the mold cavities causes the formed molded plastic material to solidify or harden permitting the molded articles to be removed from the apparatus. The combination of rapid build-up and release of pressures plus alternate continuous heating and cooling permits the molding of hollow thin walled articles having portions which are thicker at one part than another as an integral unit in a manner not possible heretofore.

Accordingly, one of the objects of the present invention is to provide improved apparatus for molding thin walled articles.

Another object of the present invention is to provide improved apparatus for molding hollow articles having thin walled bodies which are provided with thicker portions at one end or section thereof.

A further object of the present invention is to provide an apparatus for the continuous molding of articles having means permitting rapid build-up of pressures and quick relief thereof to rapidly fill a mold cavity.

A still further object of the present invention is to provide a molding apparatus with means for automatic and continuous heating and cooling of the molds and the cores provided therefor.

Yet another object of the present invention is to provide a molding apparatus which has provision for automatically moving a core into a mold cavity for the molding of the article and for automatically withdrawing a core from the mold cavity to release the molded article.

A further object of the present invention is to provide a molding apparatus with improved means for removing an article therefrom.

A further object of the present invention is to provide a molding apparatus with improved means for removing the sprues from a molded article.

Still another object of the present invention is to provide a molding apparatus with improved means for cooling and heating molds.

The above and other objects, features and advantages of this invention will be fully understood from the following description considered in connection with the accompanying illustrative drawings of the presently preferred embodiment of this invention.

Figure 1:
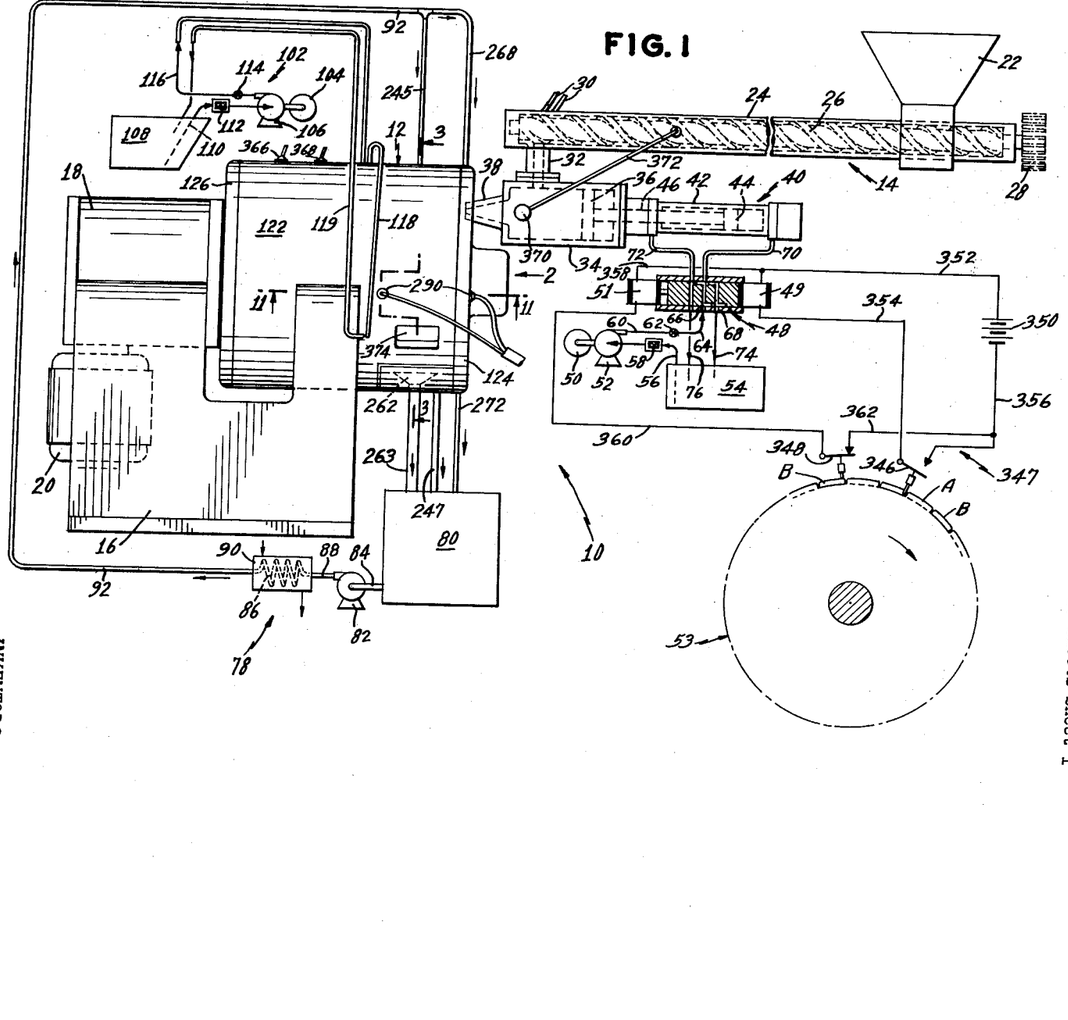
FIG. 1 is a diagrammatic view, more or less, of a molding apparatus pursuant to the present invention.

Referring now to the drawings in detail and more particularly to FIG. 1 thereof, the molding apparatus 10 pursuant to the present invention comprises a mold turntable 12 which contains the mold cavities which are supplied with molding material from an extruding mechanism 14. The turntable 12 is mounted on a supporting base 16 with its axis horizontal and is driven by an indexing mechanism 18 which is also mounted on the supporting base. The indexing mechanism is driven by electric motor 20 and causes intermittent rotating movement of the turntable in a manner well known to those skilled in the art.

Extruding mechanism 14 is of a well known type and includes a hopper 22 in which the granular plastic molding material is placed, said hopper being suitably supported by means not shown. Granular material from the hopper is fed to an extruder tube or cylinder 24 which has an extruder screw 26 suitably mounted therein, said screw being actuated by gear 28 mounted at one end thereof, the gear being powered from a source not shown. Heating elements 30 are mounted about the extruder tube to provide heat for softening or melting the plastic molding material being furnished to the screw from the hopper, as is well known to those skilled in the art.

An exiting pipe or conduit 32 is provided at one end of the extruder tube 24 which permits the passage of the heated softened plastic material from the extruder screw to a feed supply or pressure chamber 34. Chamber 34 has a piston 36 mounted for sliding movement therein for extruding the plastic material from the chamber to the mold cavities through an outlet nozzle 38. The means for supporting extruder tube 24 and feed supply chamber 34 have been omitted for the sake of clarity.

Hydraulic power means 40 are provided for actuating piston 36 for injecting the plastic material from the feed supply chamber into the mold cavities. The hydraulic power means comprises a double acting hydraulic cylinder 42 which has a piston 44 mounted for sliding movement therein, said piston 44 being connected to piston 36 via piston rod 46. The movement of pistons 44 and 36 are controlled by a solenoid actuated hydraulic valve 48, said valve being provided with a right solenoid 49 and a left solenoid 51. The solenoids are operated by a cam mechanism 53 which will be fully described hereinafter.

A motor 50 is provided which drives a hydraulic pump 52 to supply pressurized hydraulic fluid from a supply tank 54, the hydraulic fluid flowing from the supply tank, via pipe 56, through a filter 58, through pump 52, through pipe 60, which is provided with a shut-off valve 62, and then through pipe 64 to the previously mentioned hydraulic valve 48.

The hydraulic valve 48 is provided with an inlet port 66 and outlet ports 68; pipes 70 and 72, respectively, being provided connecting the valve ports to each end of hydraulic cylinder 42 for controlling the movements of piston 44 therein. Return pipes 74 and 76, respectively, are provided for returning hydraulic fluid from cylinder 42 to the supply tank 54. The operation of the hydraulic power system and the extruding mechanism will be explained more in detail hereinafter.

A cooling system 78 is provided for supplying a chilled fluid or liquid to the mold cavities and the cores of the mold turntable 12 and comprises a liquid supply tank 80, a pump 82 connected thereto via pipe 84, said pump being driven by a motor (not shown). Liquid from pump 82 is conducted to a cooling coil 86, via pipe 88, said cooling coil being immersed in a cooling bath 90 for supplying chilled water or other fluid to the mold turntable via pipe 92. The chilled liquid system and the various pipes and drainage connections will be more fully explained hereinafter.

Another hydraulic power system 102 is provided for actuating the cores of the molding apparatus, as will be fully understood hereinafter. The hydraulic power system 102 comprises an electric motor 104 which drives a hydraulic pump 106 to pump hydraulic fluid from a supply tank 108, via pipe 110 through filter 112. Fluid from the pump passes through a shut-off valve 114 and is led, via pipe 116, to the mold turntable 12. Pipe 118 is provided to connect the upper part of the mold turntable with the lower part thereof to permit hydraulic fluid to flow from the upper part of the mold turntable to the lower part thereof, for reasons which will be fully explained hereinafter. From the lower part of the turntable, fluid is conducted back to tank 108 via pipe 119.

Figure 2:
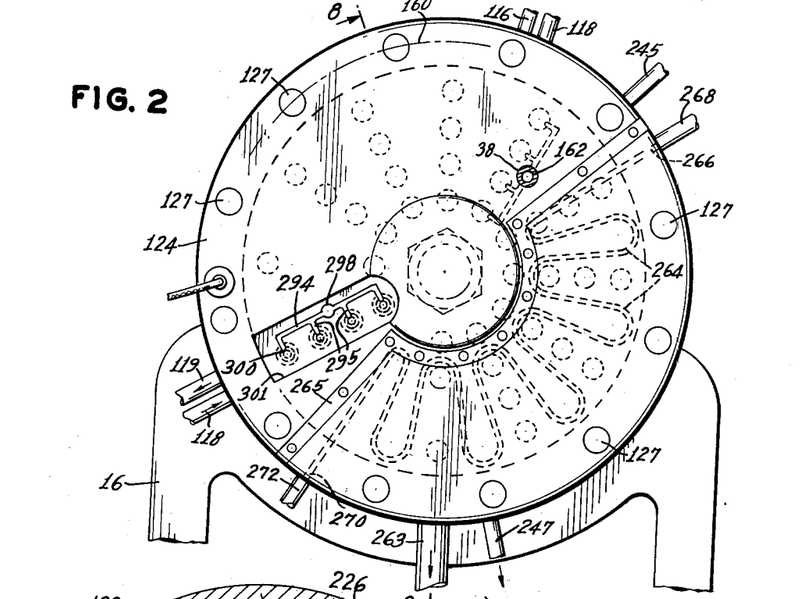
FIG. 2 is a view, on an enlarged scale, taken in the direction of arrow 2 of FIG. 1.
Figure 3:
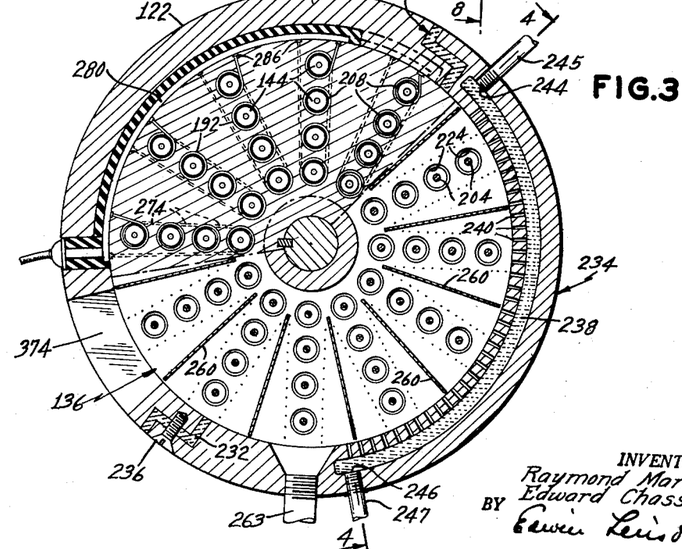
FIG. 3 is a sectional view, on an enlarged scale, taken along line 3—3 of FIG. 1.
Figure 4:
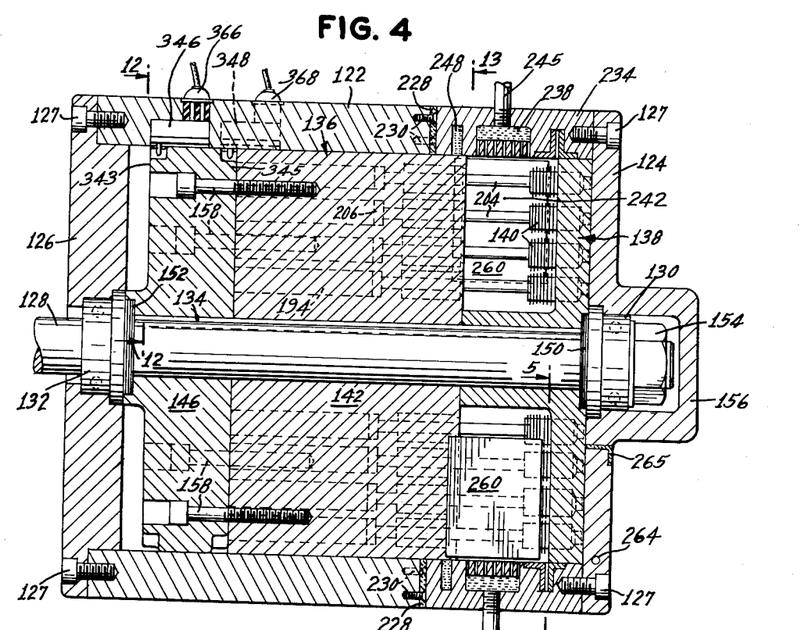
FIG. 4 is a sectional view taken along line 4—4 of FIG. 3.

Referring now to FIGS. 2, 3 and 4, the mold turntable 12 comprises a drum 122 enclosed at each end thereof by cover plates 124 and 126, respectively, which are secured to the drum by bolts 127. A shaft 128 is provided along the horizontal longitudinal axis of the drum and is supported for rotational movement within the drum by bearings 130 and 132, respectively, said bearings being mounted in cover plates 124 and 126, respectively, as best seen in FIG. 4. It will be understood that shaft 128 is driven by the previously mentioned indexing mechanism 18.

Figure 8:
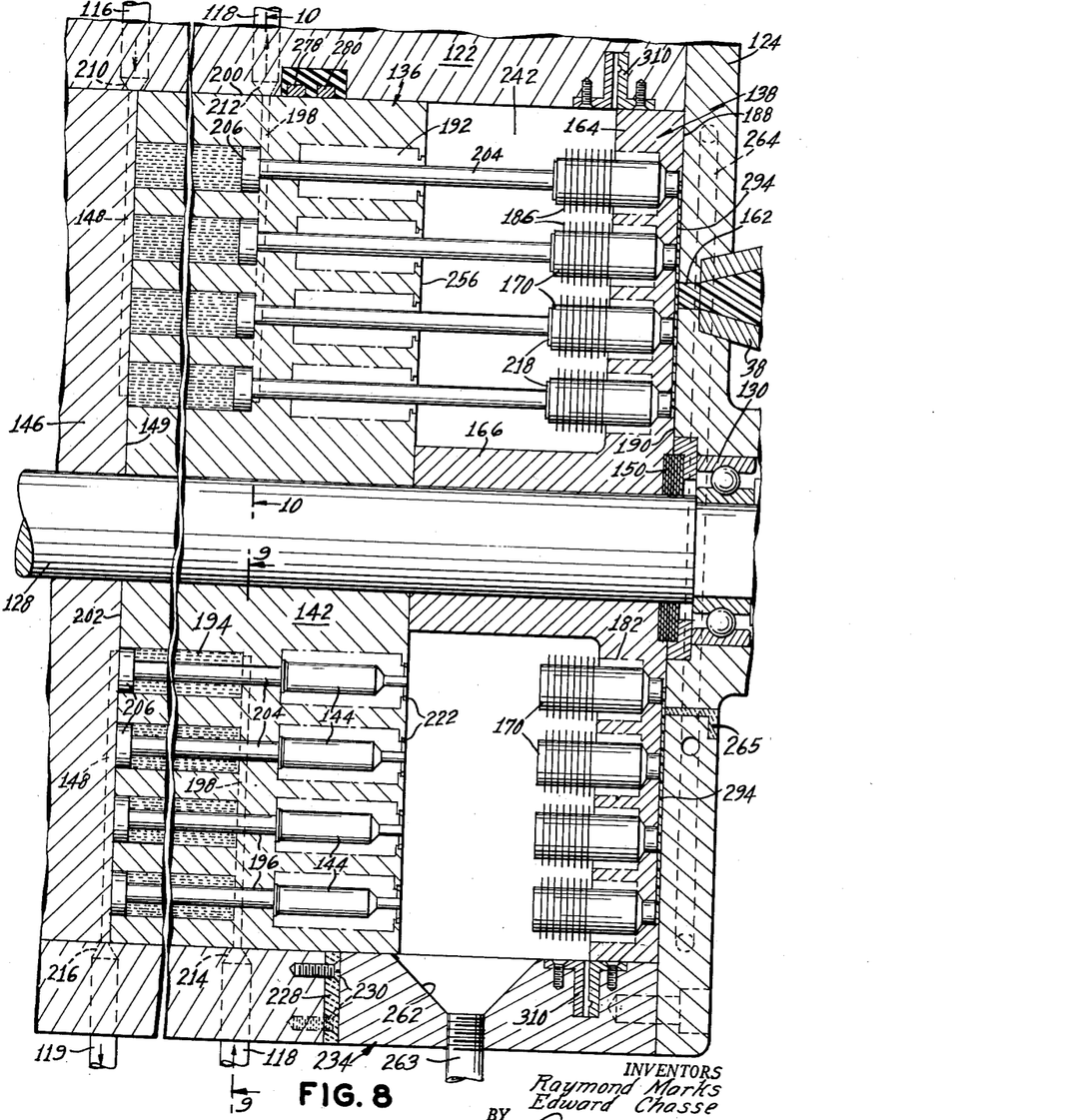
FIG. 8 is a sectional view, on an enlarged scale, taken along line 8—8 of FIG. 2.
Figure 9:
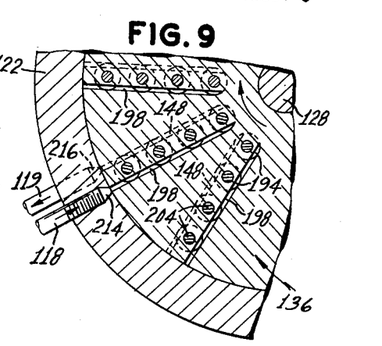
FIG. 9 is a partial view, on a smaller scale, taken along line 9—9 of FIG. 8.
Figure 10:
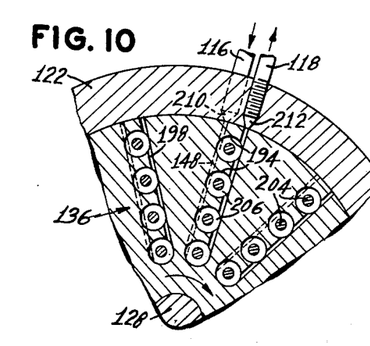
FIG. 10 is a partial sectional view, on a smaller scale, taken along line 10—10 of FIG. 8.

Keyed to shaft 128 along keyway 134 is a rotor 136 mounted internally of drum 122. The rotor consists of three sections, a forward section or mounting plate 138, which mounts the mold cavities 140, a center section 142, which provides means for supporting movably mounted cores 144, and a rear section 146 which is provided with grooves 148, on the front face 149 thereof, as best seen in FIGS. 8, 9 and 10, to supply hydraulic fluid for actuating the cores, as will be more fully understood hereinafter. It will be understood that rotor 136 rotates within drum 122 and, accordingly, seals 150 and rings 152 are provided between the bearings and the rotor to prevent leakage therebetween. A locking nut 154 is provided to tighten the bearings against the seals and rings, as best seen in FIG. 4, cover 124 being provided with a cap portion 156 to enclose the end of the shaft 128 provided with the locking nut 154. Bolts 158 may be provided for securing center section 142 and rear section 146 to each other, it being understood that all three sections are keyed to shaft 128, as previously mentioned.

Figure 16:
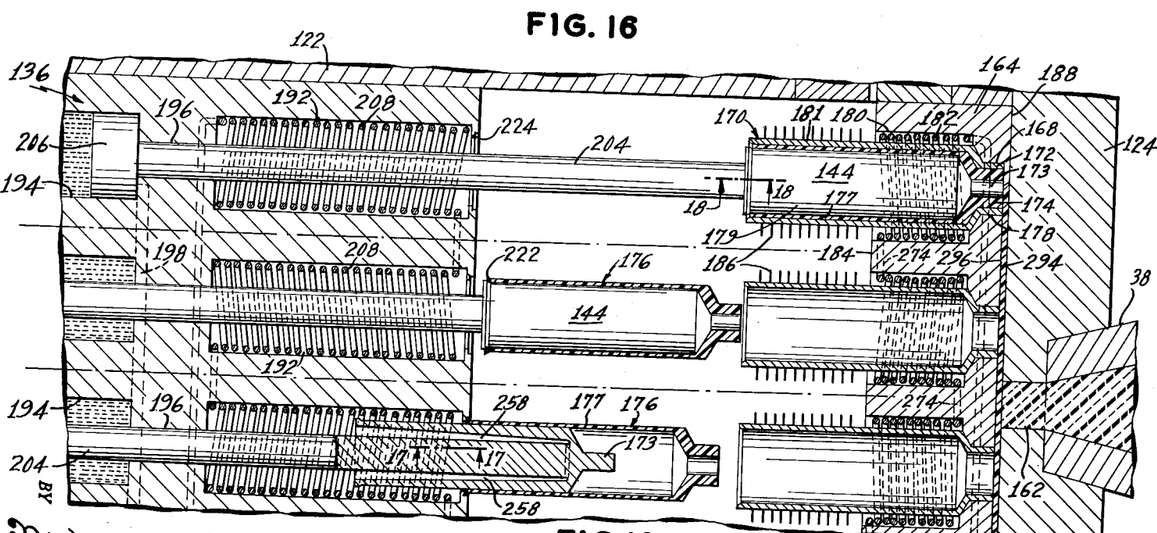
FIG. 16 is a partial sectional view, on an enlarged scale, similar to FIG. 8, illustrating the removal of the molded article from the core.
Figure 16A:
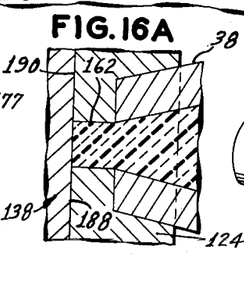
FIG. 16A is a detail view illustrating the relationship of the nozzle of the extruding mechanism and the face of the mold turntable.

As best seen in FIGS. 2, 8 and 16A, cover plate 124 is a circular shaped member with the previously mentioned bolts 127 mounted along a bolt ring 160 along the circumference thereof, and a through hole 162 is provided through the plate at the 1:00 o'clock position thereof to receive the end of the previously mentioned outlet nozzle 38 of the feed supply chamber 34. The 1:00 o'clock position of the turntable is the molding station at which molding material is injected into the mold cavities as will be described hereinafter. The forward section of rotor 136 is the previously mentioned mounting plate 138 and comprises a flat disc-shaped plate 164 having a hub portion 166 which is keyed to shaft 128, as previously mentioned. Plate 164 is provided with a plurality of holes 168 which are concentrically spaced about the longitudinal axis of the rotor and extend radially therefrom in a pattern of the face of a clock, as best seen in FIG. 3, there being four holes forming a group along each line radiating from the axis of the rotor, it being understood that as many holes as desired may be provided. As best seen in FIGS. 4 and 8, press-fitted into each hole 168 of the mounting plate 138 is a tube member 170 which provides a mold for the articles. Referring to FIG. 16, it will be seen that each of the tube members or molds 170 has a neck portion 172 which with part 173 of the previously mentioned core 144 provides a mold cavity to form the cap portion 174 of a hollow thin walled tube 176. The body portion 177 of the tube is formed in the mold cavity created by part 179 of the core and part 181 of the mold, as best seen in FIG. 16. Neck portion 172 is that part of the tube member or mold which is press-fitted into the narrow portion 178 of hole 168, said hole being provided with an enlarged portion 180 which is adapted to receive a heating coil or an induction coil 182 which encircles the lower half of the tube member 170. Each tube member extends from the rear face 184 of plate 164 of the mounting plate 138 and is provided with heat transferring fins 186 to promote rapid cooling of the tube members 170 as will be fully explained hereinafter. The outward face 188 of plate 164 is in abutting surface-to-surface contact with the inner face 190 of cover plate 124 which permits automatic building-up of excess pressures in the molding material as will be fully understood hereinafter.

Referring now to FIGS. 4, 8 and 16, it will be noted that center section 142 of the rotor is provided with cylinders 192 in the forward part of the center section and with cylinders 194 in the rear part of the center section, said cylinders being connected to each other by a through hole 196. It will be understood that the cylinders are arranged in a pattern similar to the face of a clock in the exact same manner as the tube members 170 which with the cores provide the mold cavities for the articles. As best seen in FIGS. 8 and 9, each of the cylinders 194 of a group of four is hydraulically connected to each other at the forward part thereof by conduits 198 which extend outwardly to the peripheral edge 200 of center section 142. The rear part of cylinders 194 extend to the rear surface 202 of center section 142 and are adapted to line up with the previously mentioned grooves 148 which are formed in the forward face 149 of rear section 146, for reasons which will be fully understood hereinafter.

Mounted for sliding movement in each of holes 196 is a piston rod 204, which has mounted at the forward end thereof the previously mentioned core 144 and at the rear end thereof a piston 206. Mounted along the inner surface of each of cylinders 192 is a heating coil or induction coil 208 which provides means for heating the core when it is nested within the cylinder in its retracted position, as best seen in FIG. 16. Hydraulic fluid is conducted to either end of piston 206 to move core 144 into or out of the molds 170 during the automatic molding operation. As center section 142 is rotated by the previously mentioned indexing mechanism 18 within drum 122, grooves 148 and conduits 198 will align themselves with inlet and outlet ports 210 and 212, respectively, provided in drum 122 in the 12:30 o'clock position thereof and inlet and outlet ports 214 and 216, respectively, provided in the 8:00 o'clock position of the drum, as shown best in FIGS. 8, 9 and 10. Inlet 210 is connected to the previously mentioned source of hydraulic fluid via pipe 116. Outlet 212 is connected to inlet 214 via pipe 118, and outlet 216 is connected to the previously mentioned pipe 119 to return hydraulic fluid to the supply tank 108. Thus it will be seen from the foregoing that as center section 142 rotates upon the actuation of the indexing mechanism 18, the inlets and outlets, 210, 212, 214 and 216, will become aligned with grooves 148 and conduits 198 to cause hydraulic fluid to flow to the left side of piston 206 causing said piston to move to the right, as viewed in FIG. 8, thereby causing the core to move to the right and into the mold 170 to form the previously mentioned mold cavity 140. As the piston moves to the right, hydraulic fluid will be pushed from the right side of piston 206 and will leave cylinder 194 via conduit 198. Hydraulic fluid from conduit 198 will be conducted via outlet 212 and pipe 118 into inlet 214, to cause the group of pistons 206 in the 8:00 o'clock position to move to the left. The movement of pistons 206 to the left causes hydraulic fluid to flow from the left side of pistons 206 in the 8:00 o'clock position through conduit 148 and out through outlet 216 wherein the fluid will return to tank 108 via pipe 119. (See FIG. 1.) From the foregoing it will be seen that no valves are required to control the movement of the cores into and out of the molds and that movement of a core into extended position into a mold which is in one position to form a mold cavity therein causes a simultaneous and opposite retracting movement of a core out of a mold which is in another position.

Figure 17:
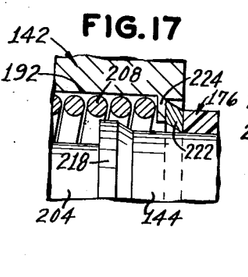
FIG. 17 is a fragmentary sectional view, on an enlarged scale, taken along line 17—17 of FIG. 16.
Figure 18:
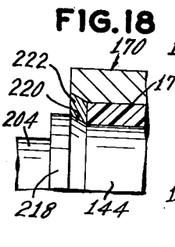
FIG. 18 is a fragmentary sectional view, on an enlarged scale, taken along line 18—18 of FIG. 16.

Referring now to FIGS. 16, 17 and 18, each of cores 144 is provided at the rear end thereof with a shoulder portion 218 and an inclined portion 220 which carries a ring 222. The forward part of cylinder 192 is provided with an inwardly extending peripheral flange 224. As the cores are moved into their retracted position, they will be withdrawn from the mold cavities carrying the molded articles 176 thereon and upon further movement into their retracted position the rings 222 will engage the flanges 224 causing the molded articles to be pushed off of the cores, as clearly shown in FIG. 17.

The previously mentioned cooling system 78 provides means for cooling both the tube members 170 and mold cavities 140 as well as providing means for cooling the cores 144. Referring now to FIGS. 2 to 4 and 13 to 15, the drum 122 is provided with an insulating member 226 which has the shape of a section of a cylinder and is secured to the drum along flange 228 thereof by bolts 230. As best seen in FIG. 3, it will be noted that insulating member 226 extends from about the 1:00 o'clock position to the 8:00 o'clock position of the mold turntable and is provided with Z-shaped ends or ribs 232 which extend forwardly of flange 228 and are perpendicular thereto. A water jacket 234 is provided which is secured to insulating member 226 along Z-shaped ends 232 by screws 236. The water jacket extends, as best seen in FIG. 3, from about the 1:00 o'clock position to the 8:00 o'clock position of the mold turntable and is a section of a cylinder as is the insulating member 226. The water jacket is provided with a header 238 which has communicating holes 240 to transmit cooled fluid in the form of a jet spray from the header to the interior open area 242 (see FIG. 4) between the forward section or mounting plate 138 and the center section 142 of the rotor of the mold turntable. As best seen in FIG. 3, the header extends approximately from the 2:00 o'clock position to the 5:00 o'clock position and is provided with an inlet 244 at the 2:00 o'clock position and with an outlet 246 at the 5:00 o'clock position. Depending upon the molding material being used and the temperature of the chilled fluid employed, the cooling area may be extended to the 6:00 o'clock or 7:00 o'clock positions, if so desired. Inlet 244 is connected to the previously mentioned pipe 92, via pipe 245, and outlet 246 is connected to pipe 247 (see FIG. 1), so that chilled liquid from cooling coil 86 will be transmitted through the header for supplying chilled liquid into open area 242. Pipe 247 conducts chilled liquid from the header to the tank 80. The spray of chilled liquid will fall on the fins 186 and thereby cool the molds.

Figures 13, 14, 15:
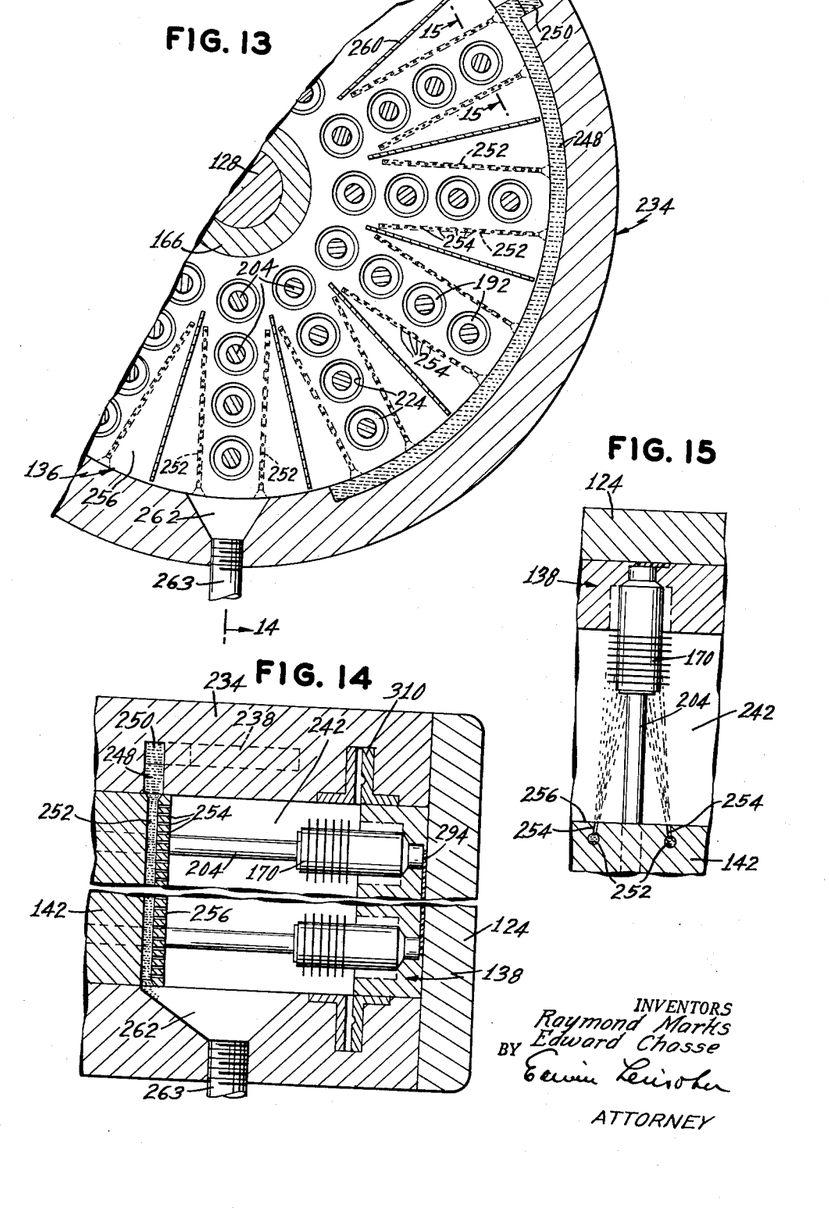
FIG. 13 is a partial sectional view, on an enlarged scale, taken along line 13—13 of FIG. 4.
FIG. 14 is a partial sectional view, on an enlarged scale, with parts broken away, taken along line 14—14 of FIG. 13.
FIG. 15 is a fragmentary sectional view, on an enlarged scale, taken along line 15—15 of FIG. 13.

Water jacket 234 is provided with another header 248 which is connected to header 238 by conduit 250 provided in the water jacket, as best seen in FIGS. 4, 13 and 14. Header 248 supplies chilled liquid to channels 252 which are formed in center section 142 of the rotor along each side of each group of four cylinders 192, as best seen in FIG. 13. Connecting channels 252 with the inner area 242 to supply a jet spray of cooled fluid to the rear parts of the mold cavities and the fins mounted thereon, as best seen in FIGS. 14 and 15, is a plurality of holes 254 which are drilled into the forward face 256 of center section 142. As best seen in FIG. 16, the aforesaid jet spray of cooling fluid also aids in the cooling of the cores 144 when said cores are in their extended position in the molds. It will be noted in FIG. 16 that the cores are provided with longitudinally extending channels 258 internally thereof which are adapted to receive a jet spray for cooling the cores internally. As the cores are cooled internally and as the molds are also cooled, the molded articles in the mold cavities will also cool and thereby are prepared for their subsequent removal from the apparatus. In this regard, it will be understood that relatively fast and uniform heat dispersion is obtained in both the molds and cores by use of a beryllium-copper metal alloy in forming these parts. Such material has the desirable property of quickly distributing heat throughout the metal mass and in addition is strong enough to withstand the high pressures encountered during the molding operation. In forming thin walled molded articles in accordance with the present invention, cooling is thus accomplished very quickly, as heat is readily removed from the cores and molds, and since the molded article has a relatively thin cross-section, it also is solidified very quickly, as a result of the cooling process.

It will be seen from FIG. 3 that the aforesaid described cooling operation occurs between the 2:00 o'clock and 5:00 o'clock positions of the mold turntable and that each group consisting of four mold cavities is separated from the other by a plate 260 which is secured in the face 256 of center section 142 and extends upwardly therefrom. These plates prevent cooling fluid from leaving the cooling area, which is between the 2:00 o'clock and 5:00 o'clock positions, and flowing into other groups of mold cavities which are remote from the cooling station.

At the 6:00 o'clock station, as best seen in FIGS. 3, 13 and 14, there is provided an outlet 262 which drains all the cooling fluid that may be remaining between the plates 260 of a group of molds. From drain 262 the cooling fluid returns to supply tank 80 via pipe 263, as best seen in FIG. 1. In addition, cooling fluid is also drained from channels 252 into outlet 262, as best seen in FIG. 14.

To keep cover plate 124 cool during the cooling operation, the plate is provided with a continuous winding conduit 264, as best seen in FIG. 2, which extends from the 2:00 o'clock position to the 7:00 o'clock position, the contours of the conduit following the positions of the mold cavities as is clearly shown. This part of the cover plate is insulated from the rest of the cover plate along flange 265 thereof, said flange being used also to connect the parts of the cover plate together. An inlet 266 is provided which is connected to pipe 268, as best seen in FIG. 1, and an outlet 270 is provided which is connected to pipe 272 for returning chilled liquid to tank 80, said chilled liquid being supplied to the conduit 264 via pipes 92 and 268.

Figure 11:
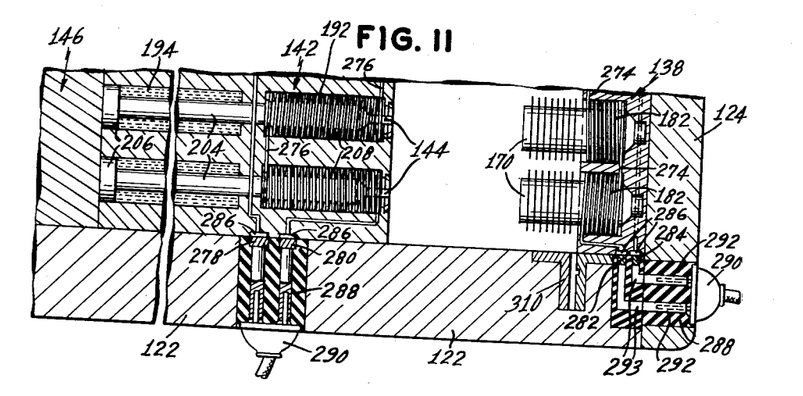
FIG. 11 is a partial sectional view, on an enlarged scale, with parts broken away, taken along line 11—11 of FIG. 1.

Heating of the cores occurs between the 9:00 o'clock and 12:00 o'clock stations and heating of the molds occurs between the 9:00 o'clock and 1:00 o'clock positions. As was previously mentioned the tube members 170 are provided with heating or induction coils 182, the coils of each group of four tube members being connected in series by wires 274, as best seen in FIGS. 3, 11 and 16 and, similarly, the previously mentioned heating coils 208 for the cores are connected in series by wires 276 in groups of four each. The heating of the cores and molds is preferably accomplished by induction heating since such heating means are faster than heating by conduction. A pair of bus bars 278 and 280, respectively, is mounted on drum 122 along the peripheral inner surface thereof between the 9:00 o'clock and 12:00 o'clock positions, as best seen in FIGS. 3 and 11, for furnishing electrical power to heating coils 208 for the cores. Similarly, another pair of bus bars, 282 and 284, respectively, is mounted along the inner peripheral surface of the drum between the 9:00 o'clock and 1:00 o'clock positions for supplying electric power to the heating coils 182 of the tube members or molds. In this regard it will be understood that the heating of the cores occurs between the 9:00 o'clock and 12:00 o'clock positions while the heating of the molds occurs between the 9:00 o'clock and 1:00 o'clock positions. Contacts 286 are provided for each of the ends of the heating coils and are adapted to engage the bus bars as the rotor moves within the heating positions. Each of the bus bars are insulated from the drum 122 by insulation 288 and a plug 290 is provided for each of the pairs of bus bars to supply electric power thereto. With respect to bus bars 282 and 284, it will be noted that each of said bus bars is adapted to engage insulated conductors 292 which are mounted in the cover plate 124 and are in electrical contact with conductors 293 extending from bus bars 282 and 284.

Accordingly, from the foregoing it will be seen that as the rotor rotates, the heating coils for each group of four mold cavities will be electrically connected to a source of power between the 9:00 o'clock and 1:00 o'clock positions, thereby providing heat for the molds. Also, as the rotor rotates, the heating coils for each group of four cores will be electrically connected to a source of power between the 9:00 o'clock and 12:00 o'clock positions thereby providing heat for the cores. It will be recalled that the cores are in their retracted position nested within their respective heating coils between the 9:00 o'clock and 12:00 o'clock positions. In this regard it will be remembered that the cores are alternately moved into their retracted positions when said core members pass the 8:00 o'clock position so that when the core members continue on to the 9:00 o'clock position they will be in retracted position for the subsequent heating thereof. It will also be clear that no electrical switching is needed for providing this periodic, continuous and predetermined heating of the coils and molds.

Refering now to FIGS. 2 and 5 through 7, it will be noted that each of the mold cavities 140 which is formed between a core 144 and a tube member 170 is connected to each other by runners 294 and gates 295 which are formed in grooves 296 provided in the forward face 198 of the mold mounting plate 138. The runners are enlarged to provide a circular recess 298 which is adapted to move into superimposed relation to the previously mentioned hole 162 provided in cover plate 124 through which nozzle 38 is extended to provide molding material for the mold cavities. During the molding operation, which will be described hereinafter, the grooves and circular recess 298 fill with molding material to form the runners 294 and gates 295. It will be understood, as previously described, that as the cores are removed or retracted from their extended position in the tube members 170 the molded articles 176 will remain on the cores, as seen in FIG. 16, and the relatively thin and weak joint 300 (see FIG. 2) connecting the gates 295 and runners 294 with the molded article will break, thereby leaving the runners and gates in the grooves 296 to be subsequently ejected from the apparatus at the 8:00 o'clock station. Means are provided for removing the runners and gates from the grooves prior to or concurrently with the ejection of the molded articles from the apparatus. This removal occurs at the 8:00 o'clock position and an opening 301 is provided in cover plate 124 through which the broken off runners and gates pass during their ejection from the apparatus.

It will be noted from FIG. 7 that the cavities for the molded articles are placed so that the ends of the molded articles are below face 188 of the mold mounting plate. The gates lead to the mold cavities from the runner grooves formed in the surface of the mounting plate, as previously described and as best shown in FIGS. 2 and 16. Since the gates are of smaller diameter than the runners, the gates are easily broken free from the molded articles along the previously mentioned joint 300 when the cores are retracted thereby separating the gates and runners from the molded articles. Because of the relatively small diameters of the gates, they permit additional increases of pressure to occur in the molding material as the molding material passes through the gates for the subsequent entry thereof into the mold cavities. The gates also, due to their restricted openings, add to the velocity of the material as it flows into the mold cavities, and provide a means for sealing off the mold cavities as soon as the cavities are filled. The gates solidify very quickly on cooling and thereby prevent molding material from being forced back from the mold cavity due to any back pressures that may occur.

Figures 5, 6, 7:
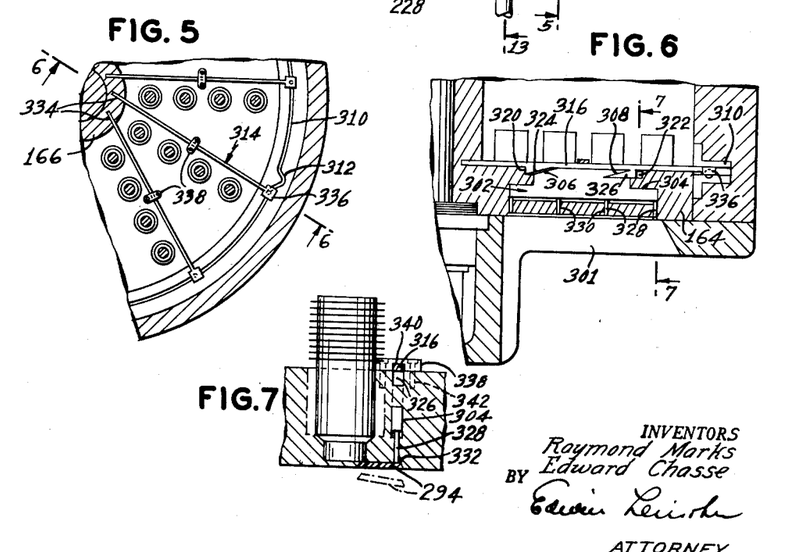
FIG. 5 is a partial sectional view taken along line 5—5 of FIG. 4.
FIG. 6 is a partial sectional view, on an enlarged scale, taken along line 6—6 of FIG. 5.
FIG. 7 is a fragmentary sectional view, on an enlarged scale, taken along line 7—7 of FIG. 6.

Referring now to FIGS. 5, 6 and 7, the runner ejecting mechanism comprises a cam member 302 which is mounted for horizontal movement above the runner in a cutout 304 provided in plate 164 of the mounting plate 138, it being understood that a cam member 302 is provided for each runner or group of molds. As best seen in FIG. 6, each cam member is provided at one upper corner thereof with a slanting cam surface 306 and at the other upper corner thereof with a cutout cam surface 308. A circular shaped track 310 is mounted along the inner peripheral surface of the water jacket 234 and the drum 122 as shown in FIGS. 4, 5 and 6. At the 8:00 o'clock station, as shown in FIG. 5, the track is provided with an indented portion 312 for actuating a cam member 314 which causes cam member 302 to move forward thereby resulting in the ejection of the runner 294 and gates 295 from the apparatus through opening 301 therein. Cam member 314 comprises a rod 316 which is mounted for sliding movement on rear face 184 of plate 164, cutouts 320 and 322, respectively, being provided in said face to accommodate cam portions 324 and 326, respectively, which depend from rod 316. Cam member 302 is provided with knockout pins 328 which pass through holes 330 provided in plate 164, the knockout pins being in abutting relation with the rear surface 332 of the runners, as best seen in FIG. 7. It will be noted from FIG. 7, that the normal position of the forward ends of the knockout pins is at the bottom of the runner grooves. One end of rod 316 is mounted for sliding movement in slot 334 provided in hub portion 166 of the mounting plate 138, the other end of the rod being provided with a track follower ball portion 336 which is adapted to ride in the track 310. It will be understood that a slot 334 is provided for receiving one end of each of the rods and a rod is provided for each group of molds. The cam portion 324 of cam 314 is in abutting relation with the slanting cam surface 306 of cam member 302 and cam portion 326 of cam 314 is mounted within the cutout cam surface 308 of cam 302, the interengagement of cam portion 326 with cam surface 308 supports cam 302 in cutout 304. A bracket 338 is provided having a groove 340 therein for guiding the movement of rod 316, said bracket being secured to plate 164 by securing elements 342, as best seen in FIG. 7.

From the foregoing it will be seen that as the rotor rotates within drum 122 and water jacket 234, the ball portion 336 of each of the rods 316 will travel in track 310. When a rod comes into the 8:00 o'clock position, the ball portion thereof will engage indented portion 312 of the track, causing cam member 314 to move outwardly, as seen in FIG. 5. This outward movement of cam member 314 causes cam member 302 to move forwardly toward cover plate 124, said movement being due to the engagement of cam portion 324 with cam surface 306. Upon forward movement of cam 302, pins 328 will move forwardly in their holes 330 pushing out the runner and gates which will be ejected from the apparatus through opening 301 in the cover plate 124. It will be noted that as cam member 314 moves outwardly, cam portion 326 thereof will move freely in cutout 322. As the rotor continue to move and the rod moves past the 8:00 o'clock station, the contours of the track 310 will cause the cam member 314 to return to the position shown in FIG. 6 and this returning motion will cause the rearward or inward movement of pins 328 and cam member 302, said movement being caused by the abutting relationship between cam portion 326 of cam member 314 and cutout cam surface 308 of cam member 302.

Figure 12:
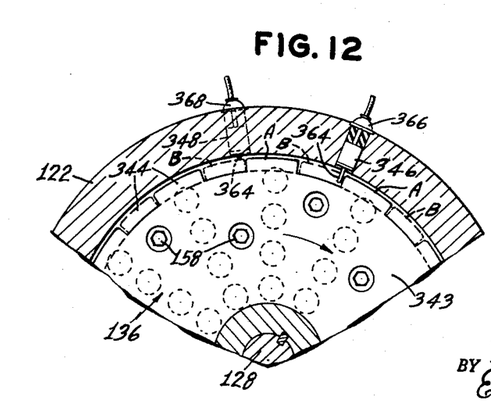
FIG. 12 is a partial sectional view, taken along line 12—12 of FIG. 4.

Referring now to FIGS. 1, 4 and 12, the electrical control system for controlling the injection of plastic material into the mold cavities includes the previously mentioned cam mechanism 53 which comprises a plurality of cams 344 which are mounted along the circumferential edges of the rear rotor section 146. Two cams are associated with each group of four mold cavities, or, in other words, two cams are associated with each o'clock position of the mold turntable. Cam A is operative to control actuation of the previously mentioned right solenoid 49 and cam B is operative to control the actuation of the previously mentioned left solenoid 51 and it will be understood that cams identical to cams A and B are provided for each group of four mold cavities. As best seen in FIGS. 1 and 4, the A cams are circumferentially spaced along rear edge 343 of the rear rotor section and the B cams are circumferentially spaced along forward edge 345 of the rear rotor section. There are twelve A cams provided and twelve B cams provided, the cams being provided for each o'clock position of the turntable. A microswitch 346 is in a circuit 347 for controlling the actuation of solenoid 49 and another microswitch 348 is in the same circuit for controlling solenoid 51, said circuit 347 being powered from a suitable source of power such as a battery 350. When switch 346 is closed upon engagement of an A cam therewith electrical power will flow from battery 350, through lead 352, through solenoid 49, through lead 354, through switch 346, and back to battery 350 through lead 356. When switch 348 is closed by engagement of a B cam therewith, electrical energy will flow from battery 350, through lead 352, through lead 358, through solenoid 51, through lead 360, through switch 348, and back to battery 350 via leads 362 and 356. The cams are equally spaced from each other and the spaces between the A cams are equal to the length of the B cams. The spaces between the B cams are equal to the length of the A cams so that during the operation of the turntable, either switch 346 or switch 348 is closed to energize its respective solenoid 49 or 51.

As best seen in FIGS. 4 and 12, switches 346 and 348 are mounted in drum 122 with their actuating arms 364 in the path of movement of the cams 344. Plugs 366 and 368, respectively, may be provided for connecting the switches 346 and 348, respectively, to the leads of circuit 347 just described. Referring now to FIG. 1, when solenoid 49 is energized by the closing of switch 346, the previously mentioned hydraulic valve 48 will move to the right permitting hydraulic fluid to flow through the intake port 66 of the valve, through pipe 70, to deliver hydraulic fluid to the right side of piston 44, causing piston 36 to move to the left, wherein the pressure of the plastic material in feed supply or pressure chamber 34 will increase. This increase of pressure occurs during the indexing movement of the rotor 136, wherein the rotor is moving to line up the outlet nozzle 38 with the recess 298 of the runner 294. During this indexing movement the nozzle will be between successive recesses 298 so that face 188 of the mounting plate will close off hole 162 through which the plastic material passes, as seen in FIG. 16A, thereby permitting a very large increase of pressure of the plastic material. Closing of switch 348 will cause the actuation of solenoid 51 thereby resulting in the movement of hydraulic valve 48 to the left. Upon movement of valve 48 to the left, hydraulic fluid will be transmitted from tank 54 through inlet port 66 of the valve, through pipe 72 to the left side of piston 44 whereby piston 36 will retract in chamber 34 permitting additional plastic material to flow therein from extruder tube 24. The extending and retracting movement of piston 36 which permits pressures to be built up within chamber 34 and which also permits said chamber to be filled with plastic material are controlled by cams 344 and are inter-related with the movements of the rotor and the characteristics of the plastic material being used as well as the type and size of the article being molded.

Figure 19:
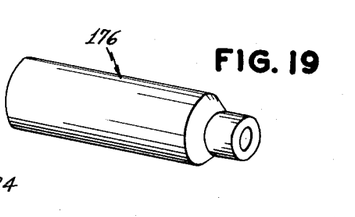
FIG. 19 is a perspective view of a thin walled hollow tube having thickened portions molded in the apparatus pursuant to the present invention.

As has been discussed above, the apparatus and method of the present invention is suitable for molding various articles and in particular thin walled containers such as the hollow plastic collapsible tube 176 shown in FIG. 19. By thin walled containers is meant such articles having a wall thickness in the order of .010 inch or greater. By means of the method and apparatus described above collapsible tubes, for example, may be produced having an inside diameter of perhaps ¾ of an inch and a length of approximately 2½ inches and sizes may vary in increments all the way up to perhaps 3½ inches in diameter by 10 inches in length or greater.

The wall thickness of the body of such containers may be as low as .010 inch. In addition, according to the present invention, the collapsible tubes may be produced so that the body of the container together with the neck and shoulder portions thereof are all molded simultaneously thereby eliminating any subsequent operations required to assemble the neck and shoulder portions of the article to the body portion thereof. In addition, the neck and shoulder portions of the article may be as much as three times the thickness or more of the relatively thin walls of the body portion of the articles. The integral molding of plastic articles having relatively thin walled body portions and other portions which are relatively thicker than the body portions may be accomplished in accordance with the present invention due to the rapid build-up and release of pressures of the molding material and the alternate heating and cooling of the molds.

Of the materials presently available for producing the molded articles, polyethylene of the low density or "branched" type produces satisfactory results. Polyethylene has the requisite flexibility, softness and workability resulting in a satisfactory finished article. It also has a fairly sharp melting range, thereby lending itself readily to producing articles in accordance with the method and apparatus of the present invention. Materials that are suitable for the practice of the present invention, including their heat sensitivity characteristics are indicated below:

| Material | Softening Range (66 p.s.i.—ASTM test), ° F. | Melting Point, ° F. |
| --- | --- | --- |
| Low Density Polyethylene | 180–210 | 230–245 |
| Linear Polyethylene | 230–240 | 260–280 |
| Polypropylene | ¹ 260 | 310–320 |
| Nylon (type 6) | ¹ 330 | ¹ 420 |
| Polyvinyl Chloride | 140–150 | ¹ 180 |

¹ (Approx.)

Figure 21:
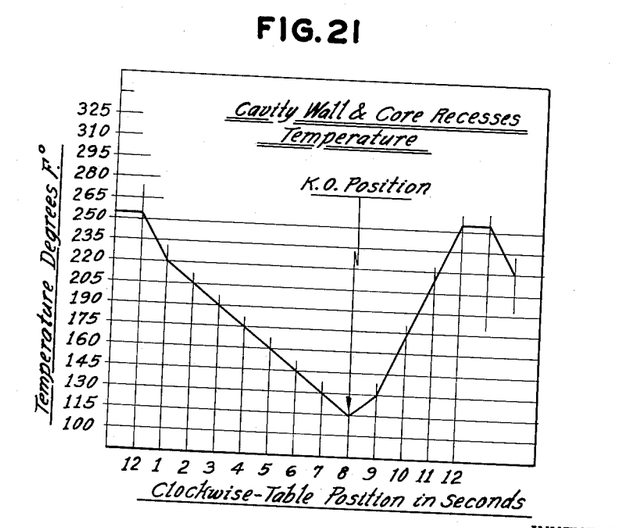
FIG. 21 is a graph illustrating the changes of temperatures occurring during the molding operation.

In employing a polyethylene for manufacturing the molded articles of the present invention, the molds or tube members 170 will be heated by heating coils 182 to a temperature of the order of 260° F. Similarly, the cores 144 will also be heated by heating coils 208 to a temperature in the order of 260° F. This heating of the molds will be accomplished between the 9:00 o'clock and 1:00 o'clock positions and the heating of the cores will be accomplished between the 9:00 o'clock and 12:00 o'clock positions of the rotor, as previously described. This temperature is shown in FIG. 21. In this regard it will be remembered that the cores for the molds have been moved into their retracted position between the 9:00 o'clock and 12:00 o'clock positions, as shown in FIGS. 8 and 9, the movement occurring as a result of the alignment of inlet 210 with grooves 148, outlet 212 with conduits 198, outlet 216 with grooves 148, and inlet 214 with conduits 198, as previously explained. The movement of the cores into their retracted position occurred at the 8:00 o'clock position, as shown in FIG. 9 and as previously explained.

As the molds move past the 12:00 o'clock position, the contacts 206 which engage the bus bars 278 and 280 for providing current to the heating coils 208 for the cores will become disengaged so that heating of the coils and cores will cease. The contacts 286 which engage the bus bars 282 and 284 for supplying current to the heating coils 182 for the mold will become disengaged from the bus bars slightly past the 1:00 o'clock position so that heating of the molds continues during the molding operation, which occurs at the 1:00 o'clock position. Referring now to FIG. 2, it will be noted that when a mold is at the 12:00 o'clock position, the succeeding mold will be at the 1:00 o'clock position with the recess 298 thereof in alignment with hole 162 in the cover plate 124 so that plastic molding material in the cover plate 124 can be injected into the mold cavity at the 1:00 o'clock position. During this molding operation, the rotor 136 will be stopped for a short period of time by the indexing mechanism 18 which drives the rotor. At this time cam A will have already closed switch 346 which energized solenoid 49 to move the valve 48 to the right, as viewed in FIG. 1, so that hydraulic fluid will be transmitted to the right side of piston 44 causing piston 36 in material feed supply chamber 34 to advance to inject plastic material into the mold.

Upon further indexing movement of the rotor, the molds previously at the 12:00 o'clock position will move into the 12:30 o'clock position wherein it will be seen from FIGS. 8 and 10 that the grooves 148 and conduits 198 align themselves respectively with inlet 210 and outlet 212. Upon alignment, hydraulic fluid flows through grooves 148 to the left side of pistons 206 to cause the previously retracted cores 144 to move into their extended position, as shown in the upper half of FIG. 8. Referring to FIG. 16 and the upper core shown therein, it will be seen that in the extended position of the core, said core is nested within tube member 170 to form the mold cavity therebetween in which the molded tube 176 is formed. The mold is now ready to receive plastic material for molding the article. It will be understood that the position of the core with respect to the tube member, as shown in FIG. 16, is the same for all four tube members that compose one group of molds since the cores for each group of molds operate simultaneously and together as can be seen in FIG. 8, wherein the upper group of four molds has the cores thereof in the extended position and the lower group of four molds has the cores thereof in the retracted position.

During this movement of the molds from the 12:00 o'clock to the 12:30 o'clock positions, the face 188 of mounting plate 138 will cover hole 162 in cover plate 124 thereby preventing any further passing of plastic material from the nozzle outlet 38. As soon as face 188 covers hole 162, cam B will close switch 348 and cam A will leave contact arms 364 of switch 346, causing switch 346 to open. With the closing of switch 348, left solenoid 51 of valve 48 will be actuated causing said valve to move to the left wherein hydraulic fluid will be transmitted to the left side of piston 44, causing piston 36 to move to the right permitting plastic molding material to fill chamber 34, said chamber being supplied with plastic material from extruding mechanism 14. The chamber very rapidly fills with the molten plastic material which, in the case of a low density polyethylene, is at a temperature of the order of 300° F. or higher and, as may be seen from the chart above, is well above the melting point for low density polyethylene. The melting of the polyethylene occurs in the extruder tube which, as previously mentioned, is furnished with heating elements 30.

Upon filling of chamber 34, which occurs very rapidly during the initial covering of the outlet of the nozzle by the face 188 of the mounting plate, cam B will leave the contact arms 364 of switch 348 causing said switch to open thereby de-energizing solenoid 51. At the same time, a succeeding cam A will engage the contact arms of switch 346 to close said switch and thereby energize solenoid 49 which will move hydraulic valve 48 to the right permitting hydraulic fluid to be conducted to the right side of piston 44, causing piston 44 to move to the left. Piston 36 of chamber 34 will move to the left causing the extrusion of the heated plastic material from the chamber. However, since face 188 of the mounting plate is covering or blocking the nozzle outlet 38, no plastic material will flow into the mold at this time thereby resulting in a rapid build-up of pressure in the molding material. This high pressure build-up occurs almost instantaneously resulting in high velocity filling of the cavities. The movement of the rotor will cease momentarily at this time due to the action of the indexing mechanism to insure the necessary time for the rapid build-up of the pressure.

Figure 20:
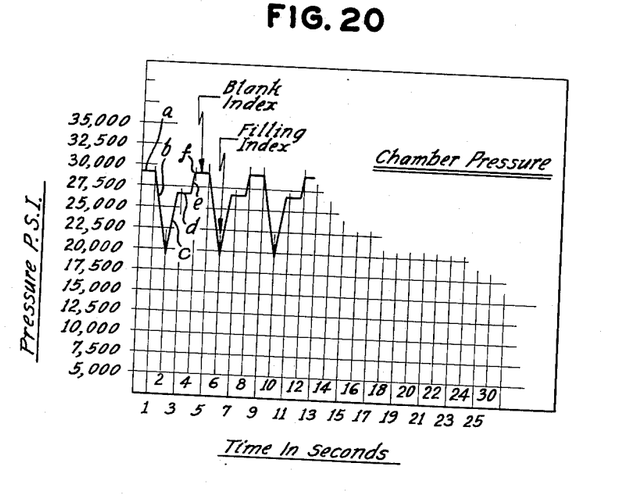
FIG. 20 is a graph illustrating the changes of pressure occurring during the molding operation.

The various pressures occurring in the molding material as the molds index from the 12:00 o'clock position to the 1:00 o'clock position, which is the molding station, are shown on the chart of FIG. 20. Line $a$ of the chart indicates a pressure of about 29,000 p.s.i. which is about the maximum pressure built up in the molding material and this pressure occurs during the indexing movement of the turntable where the nozzle outlet 38 is blocked by face 188 of the mold mounting plate. It will be understood that during this movement, piston 36 is moving forward to extrude molding material from the feed supply chamber 34. However, it will be recalled that the turntable momentarily stops when the nozzle outlet is blocked during indexing movement to insure enough time for pressure build-up, which occurs practically instantaneously. As the turntable indexes into position so that the nozzle outlet 38 and hole 162 are being aligned with recess 298 of the runners for the molds, the pressure is quickly relieved resulting in a rapid high velocity flow of molding material into the mold cavities. This explosive decompression of the pressure of the molding material causes such a high velocity of flow of the molding material into the mold cavities, the plastic material has no chance to harden or freeze as it flows into the mold cavity, thus permitting all parts of the mold cavity to be filled with the molding material, resulting in a homogeneous molded article. This explosive decompression is indicated by line $b$ of the chart of FIG. 20, where it will be noted that the pressure of the molding material falls from 29,000 p.s.i. to approximately 20,000 p.s.i. However, the pressure does not go below 20,000 p.s.i. because the minimum pressure in the chamber 34 is maintained at 20,000 p.s.i. due to the continuous motion of the extruder screw 26.

The piston 36 continues to move forward and inject molding material from the chamber 34 into the cavities so that the pressure of the molding material rapidly increases, as indicated by line $c$ of the chart of FIG. 20, the pressure increasing to around 26,000 p.s.i. At this time, the continuing movement of the turntable will cause the full alignment of recess 298 of the molds with the nozzle outlet. The indexing mechanism 18 stops the rotation of the rotary 136 for a relatively short period of time when the nozzle outlet of the mold recess are aligned for the introduction of additional plastic material into the mold. This dwell period is necessary because the molding material in the mold cavities begins to cool and shrink gradually. However, the cooling is very slight, as may be seen from the 1:00 o'clock position of FIG. 21, since the molds are continuously heated during the molding operation which takes place at the 1:00 o'clock position, as previously described. This slight shrinking of the molding material does not result in any appreciable degree of pressure loss because piston 36 is continuously moving forward to inject molding material into the mold cavities while the molding material in the mold cavities is shrinking so that the cavities are fully filled with molding material. This relatively constant pressure is indicated by line $d$ of the chart of FIG. 20. Further, continuous injection motion of piston 36 causing the pressure in the mold cavity to build upon along line $e$ of the chart of FIG. 20 wherein the pressure in the chamber will reach its maximum of about 29,000 p.s.i., at which position the rotor will again index, this position being indicated at $f$ on the chart of FIG. 20. As the rotary indexes into its next succeeding position, valve 48 will be actuated as previously described, to retract piston 36 for filling chamber 34 with molding material from the extruder mechanism 14, as previously described. If the pressure in chamber 34 exceeds 29,000 p.s.i., a relief valve 370 (see FIG. 1) will be actuated and will permit the passage of molding material from the chamber back to the tube 24 of the extruding mechanism via pipe 372.

As the molds move from the molding station at the 1:00 o'clock position of the turntable, the interengagement of the smooth surface 190 of the cover plate 124 provides a wiping action with respect to the ends of the molded articles and sprues 299 formed in the runners 294 and the recess 298. This wiping action produces a clean cut-off for the runners and the gates.

Upon further indexing movement of the rotor, the filled mold cavities will move past the molding station at the 1:00 o'clock position and enter the cooling area which is between approximately the 2:00 o'clock position and the 5:00 o'clock position as previously described. Upon entering the cooling area the filled mold cavities will immediately receive a jet spray of cooling liquid which will rapidly reduce the 250° F. temperature of the mold, cores and molded articles, by evaporative cooling, to approximately 115° F. at the ejecting station for the articles which is at the 8:00 o'clock position. This temperature change is indicated on the chart of FIG. 21 and it will be understood that these temperatures are for articles made from low density polyethylene. This cooling operation hardens the material so that the molded articles will not deform during their removal from the cores and their ejection from the apparatus. Thus it will be seen from the foregoing that by providing rapid filling of the mold cavities at very high pressures and by providing heated molds and cores with subsequent cooling thereof, hollow molded tubes have been formed as an integral unit having relatively thin wall body portions with thickened shoulders and cap portions at one end thereof.

After passing through the cooling station wherein jet sprays of cooling liquid were applied to the cores 144 and tube members or molds 170, the chilled liquid will be discharged through outlet 252, as previously described. Further movement of the rotor will bring the molded articles to the 8:00 o'clock position wherein the cores will be retracted from their extended position due to the aligning of inlet 214 with conduit 198 and outlet 216 with grooves 148. During the retracting movement of the cores the molded articles 176 will remain thereon and will be removed from the molds 170, as shown in FIG. 16. Continued retracting movement of the cores will dislodge the molded articles 176 therefrom as the lower peripheral edge of the articles engage ring 222, as previously described. When the molded articles are completely free of the cores they will drop freely out of the apparatus through opening 374 provided in drum 122, as seen in FIG. 3.

As previously described, retracting movement of cores 144 will cause the sprues to break at the joint 300 and thereby become separated from the molded articles. The separated runners and gates are ejected from the apparatus as previously described through opening 301 in cover plate 124.

Figure 22:
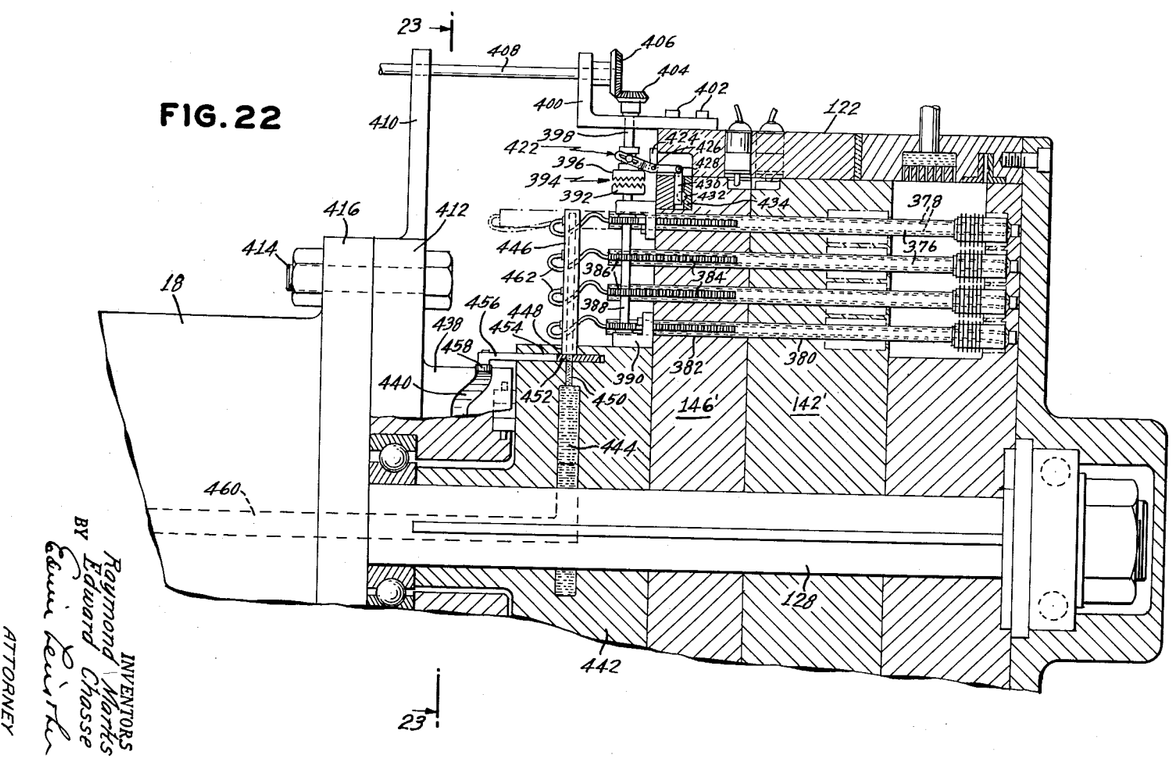
FIG. 22 is a partial sectional view illustrating a modified arrangement for cooling the cores of the molding apparatus.
Figure 23:
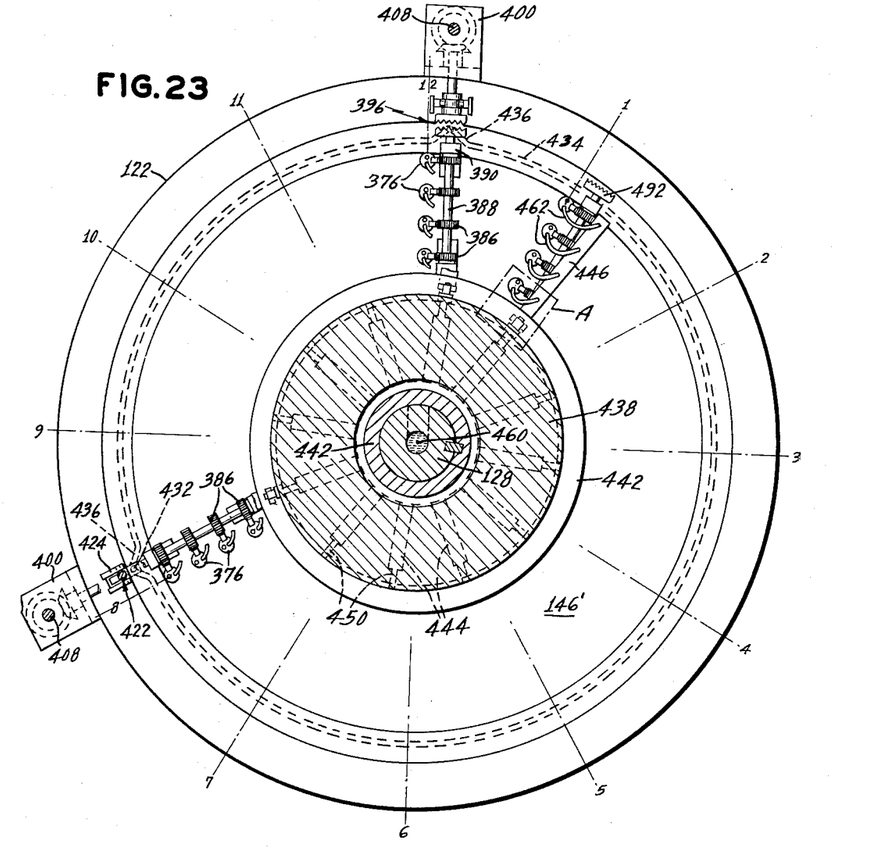
FIG. 23 is a sectional view taken along line 23—23 of FIG. 22.
Figure 24:
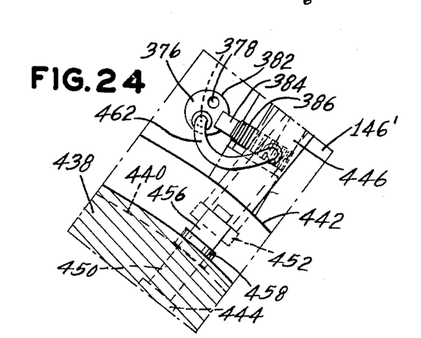
FIG. 24 is a detail view, on an enlarged scale, of the enclosed area A shown in FIG. 23.

Referring now to FIGS. 22, 23 and 24, there is shown a modified embodiment of the present invention which incorporates means for supplying a continuous stream of cooling fluid to the cores internally thereof as contrasted to the jet spray applied to the cores in the embodiment just described. In all other respects the operation of the apparatus is the same as previously described.

Cores 144 are provided with elongated shafts 376 which are provided with conduits 378 therein for transmitting a continuous stream of cooling fluid through the shafts.

The shafts are mounted for sliding movement in holes 380 and 382 provided in center section 142' and rear section 146', respectively. The rear parts of the shafts 376 are provided with rack gears 384 which are in engagement with gears 386 fixedly mounted to a shaft 388. Shaft 388 is secured to rear section 146' of the rotor by brackets 390 and is adapted to rotate with the rotor. One end of shaft 388 is provided with a mating part 392 of a clutch 394. The other mating part 396 of clutch 394 is mounted at one end of a shaft 398, said shaft being supported for rotational movement in a bracket 400 secured to the drum 122 of the mold turntable 12 by bolts 402. The other end of shaft 398 is provided with a bevel gear 404 which is in mesh with another bevel gear 406 mounted at the end of a shaft 408. Shaft 408 is mounted for rotational movement in bracket 400 and in bracket 410 which extends outwardly from a mounting plate or flange 412. Flange 412 is secured by bolts 414 to flange 416 of the indexing mechanism 18. Power is supplied to shaft 408 from a source not shown.

As best seen in FIG. 23, the mechanism comprising the shaft 408 and clutch part 396 is positioned on the mold turntable at the 12:30 o'clock position and at the 8:00 o'clock position wherein it will be recalled that at the 12:30 o'clock position the cores are extended into the molds and at the 8:00 o'clock position the cores are retracted from the molds. It will be seen in FIG. 23 that the bracket 400 is secured to the drum at the 12:30 o'clock position as well as at the 8:00 o'clock position.

Extending from shaft 398 is a pin 418 which is adapted to slide in a groove 420 formed in a bell crank 422 pivotally mounted to a bracket 424 at pivot 426, said bracket being mounted to the drum 122. Pivotally mounted to bell crank 422, at 428, is follower member 430 which has a ball portion 432 at one end thereof adapted to slide in a track 434 provided along the peripheral edge of rear section 146' of the rotor.

As best seen in FIG. 23, the track 434 is provided with extended portions 436 which engage ball portions 432 of the follower member 430 causing said member to move outwardly away from the longitudinal axis of the rotor which causes the engagement of clutch part 396 with clutch part 392. This occurs only at the 12:30 o'clock position and the 8:00 o'clock position where the extending portions 436 are provided in the track. Upon engagement of the clutch at the 12:30 o'clock position the cores will be caused to move from their retracted position, shown in dot-dash lines in FIG. 2, to their extended position within the molds. The shaft 408 provided at the 8:00 o'clock position rotates in an opposite direction from the similar shaft provided at the 12:00 o'clock position thereby causing the cores to move from their extended position, as shown in solid lines in FIG. 22, to their retracted position wherein the molded articles are removed from the cores in the same manner as previously described with respect to the other embodiment of the invention.

The hub portion 438 extending from flange 412 comprises a cylinder cam having a cam groove 440 for controlling the admission of cooling fluid to the conduits 378 in the shafts 376. Mounted on shaft 128 and keyed thereto is a member 442 which has a conduit 444 therein for conducting cooling fluid to a pipe 446. Pipe 446 is mounted in member 442 at one end thereof, as at 448. Passageway 450 is provided in member 442 connecting conduit 444 to pipe 446. A plate 452 is provided for opening or closing passageway 450, said plate being mounted for sliding movement in groove 454 provided in member 442. An arm 456 is secured to plate 452 at one end thereof, the other end thereof having a roller 458 which is adapted to follow the contours of the cam groove 440. A conduit 460 is provided in shaft 128 for transmitting cooling fluid to conduit 444, said cooling fluid being furnished from the previously mentioned liquid supply tank 80. Flexible hoses 462 connect outlets provided in pipe 446 to the conduits 378 provided in the shaft 376.

From the foregoing it will be seen that as shaft 128 rotates, member 442 will also rotate since said member is keyed to shaft 128. Rotation of member 442 will cause roller 458 to follow the cam groove 440 and when a group of four molds reaches approximately the 2:00 o'clock position plate 452 will move to the left, as viewed in FIG. 22, to open passageway 450 permitting cooling fluid to enter the conduits 378 provided in the shafts 376. The passageway will remain open during the cooling operation, which will take place approximately between the 2:00 o'clock position and the 5:00 o'clock position. It will be understood, as best seen in FIG. 24, that cooling fluid will pass through hoses 462 into one end of conduit 378 and will pass through the conduits in the shaft and pass out of the shaft through the open end of the conduit. As the rotor moves into the 6:00 o'clock position, the cooling fluid will drain from the rotor via outlet 262, as shown in FIG. 3. At approximately the 5:00 o'clock position, the passageway 450 will be closed as plate 452 is caused to move to the right, as viewed in FIG. 22, by the action of cam groove 440 on the roller 458. Accordingly, at approximately the 5:00 o'clock position, transmission of cooling fluid to the interior of the cores will cease and the cooling operation will be completed.

While we have shown and described the preferred embodiment of our invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

Having thus described our invention, what we claim and desire to secured by letters patent is:

1. Apparatus for molding one piece tubular thin walled articles having parts which are thicker than other parts, comprising a turntable, a plurality of molds mounted on said turntable, means for periodically rotating said turntable to move said molds to a molding station for the injection of molding material therein to form said articles, means located adjacent said molding station for periodically injecting molding material into said molds, a stationary drum, said turntable being mounted for rotational movement in said drum, means operative in response to movement of said turntable for heating said molds to a temperature above the softening range of said molding material prior to and during the injection of said molding material therein to permit said molding material to remain soft during the filling of said molds, and means operative in response to the movement of said turntable for cooling said molds to a temperature below the softening range of said molding material subsequent to said injection of said molding material therein, whereby said molding material hardens permitting the molded articles to be removed from said molds, said cooling means comprising a cooling jacket mounted on said drum along a segment thereof to define a cooling section for said molds, said cooling jacket being provided with a header having parts therein providing a fluid connection to a supply of cooling fluid, said cooling jacket being provided with passageways permitting fluid communication between said molds and said header to provide a spray of cooling fluid to said molds as said molds pass through said cooling section, said cooling jacket having another header in fluid communication with said first mentioned header and disposed along said cooling section, said turntable being provided with passageways adapted to align themselves with said other header during the rotation of said turntable to transmit said cooling fluid to said molds as said molds pass through said cooling section, said passageways of said turntable being positioned transversely of said passageways of said water jacket so that the direction of sprays of cooling fluid transmitted to said molds are transverse of each other.

2. Apparatus for molding one piece tubular thin walled articles having parts which are thicker than other parts, comprising a turntable, a plurality of molds mounted on said turntable, means for periodically rotating said turntable to move said molds to a molding station for the injection of molding material therein to form said articles, means located adjacent said molding station for periodically injecting molding material into said molds, a stationary drum, said turntable being mounted for rotational movement in said drum, means operative in response to the movement of said turntable for heating said molds to a temperature above the softening range of said molding material prior to and during the injection of said molding material therein to permit said molding material to remain soft during the filling of said molds, and means operative in response to the movement of said turntable for cooling said molds to a temperature below the softening range of said molding material subsequent to said injection of said molding material therein, whereby said molding material hardens permitting the molded articles to be removed from said molds, said cooling means comprising a cooling jacket mounted on said drum along a segment thereof to define a cooling section for said molds, said cooling jacket being provided with a header having parts therein providing a fluid connection to a supply of cooling fluid, said cooling jacket being provided with passageways permitting fluid communication between said molds and said header to provide a spray of cooling fluid to said molds as said molds pass through said cooling section, said cooling jacket having another header in fluid communication with said first mentioned header and disposed along said cooling section, said turntable being provided with passageways adapted to align themselves with said other header during the rotation of said turntable to transmit said cooling fluid to said molds as said molds pass through said cooling section, said drum being provided with an outlet adjacent said cooling section for the removal of said cooling fluid supplied to said molds.

3. Apparatus for molding one piece tubular thin walled articles having parts which are thicker than other parts, comprising a turntable, a plurality of molds mounted on said turntable, means for periodically rotating said turntable to move said molds to a molding station for the injection of molding material therein to form said articles, means located adjacent said molding station for periodically injecting molding material into said molds, a stationary drum, said turntable being mounted for rotational movement in said drum, means operative in response to the movement of said turntable for heating said molds to a temperature above the softening range of said molding material prior to and during the injection of said molding material therein to permit said molding material to remain soft during the filling of said molds, and means operative in response to the movement of said turntable for cooling said molds to a temperature below the softening range of said molding material subsequent to said injection of said molding material therein, whereby said molding material hardens permitting the molded articles to be removed from said molds, said cooling means comprising a cooling jacket mounted on said drum along a segment thereof to define a cooling section for said molds, said cooling jacket being provided with a header having parts therein providing a fluid connection to a supply of cooling fluid, said cooling jacket being provided with passageways permitting fluid communication between said molds and said header to provide a spray of cooling fluid to said molds as said molds pass through said cooling section, said cooling jacket having another header in fluid communication with said first mentioned header and disposed along said cooling section, said turntable being provided with passageways adapted to align themselves with said other header during the rotation of said turntable to transmit said cooling fluid to said molds as said molds pass through said cooling section, said passageways of said turntable being positioned transversely of said passageways of said water jacket so that the direction of sprays of cooling fluid transmitted to said molds are transverse of each other, said turntable being provided with plates for separating some of said molds from others to prevent said cooling fluid supplied to some of said molds from coming in contact with said other molds.

References Cited in the file of this patent

UNITED STATES PATENTS

| | | |
|---|---|---|
| 534,445 | Miller | Feb. 19, 1895 |
| 1,377,304 | Borchard | May 10, 1921 |
| 1,731,006 | Goodwin | Oct. 8, 1929 |
| 2,102,328 | Morin | Dec. 14, 1937 |
| 2,117,400 | Cobb | May 17, 1938 |
| 2,282,308 | Dahlin | May 12, 1942 |
| 2,329,346 | Goff | Sept. 14, 1943 |
| 2,624,071 | Strahm | Jan. 6, 1953 |
| 2,641,797 | Waltman | June 16, 1953 |
| 2,666,230 | Sherman | Jan. 19, 1954 |
| 2,794,574 | McGeorge et al. | June 4, 1957 |
| 2,799,435 | Abplanalp | July 16, 1957 |
| 2,801,444 | Loreian | Aug. 6, 1957 |
| 2,834,986 | Bailey | May 20, 1958 |
| 2,894,285 | Miller | July 14, 1959 |
| 2,923,975 | Voumard et al. | Feb. 9, 1960 |
| 2,939,176 | Adelman | June 7, 1960 |